Jan. 1, 1924. 1,479,013
L. B. SPERRY
DISTANCE MEASURING INSTRUMENT FOR AIRCRAFT
Filed May 5, 1921 2 Sheets-Sheet 2
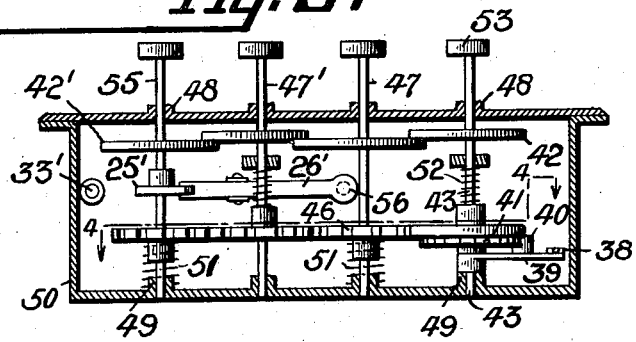
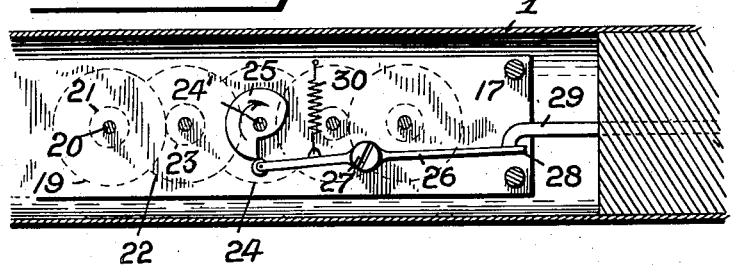
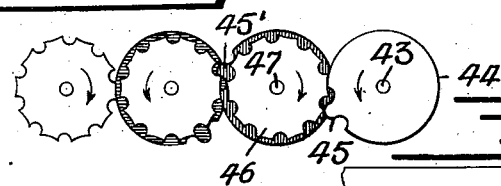
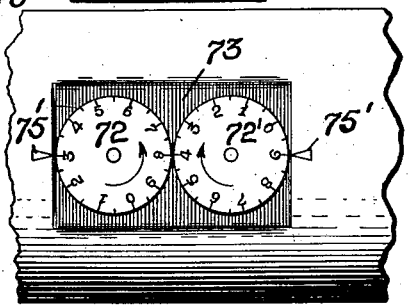
Inventor
LAWRENCE B. SPERRY.
By his Attorney
Herbert H. Thompson Patented Jan. 1, 1924.

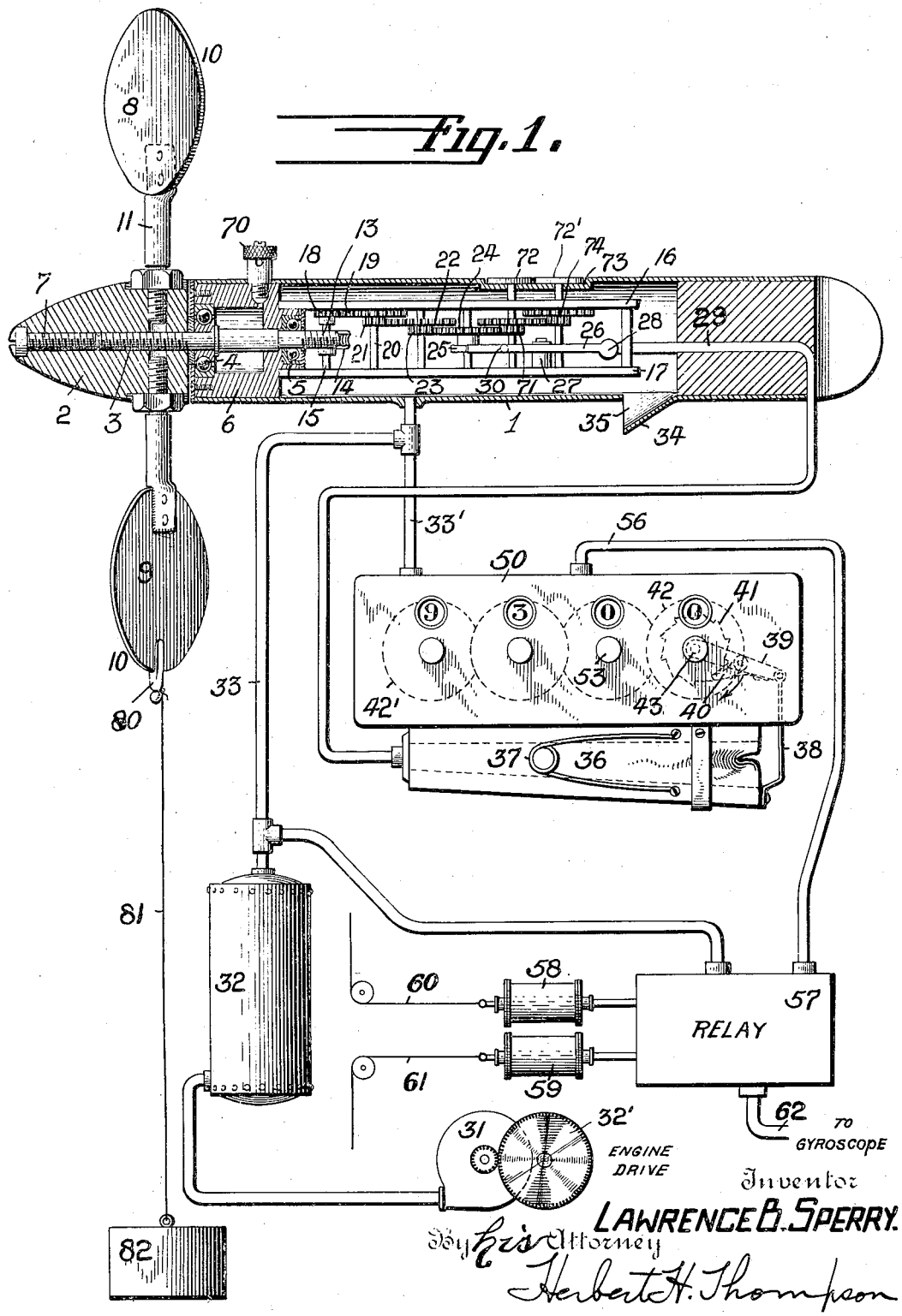

1,479,013

UNITED STATES PATENT OFFICE.

LAWRENCE B. SPERRY, OF FARMINGDALE, NEW YORK.

DISTANCE-MEASURING INSTRUMENT FOR AIRCRAFT.

Application filed May 5, 1921. Serial No. 467,158.

*To all whom it may concern:*

Be it known that LAWRENCE B. SPERRY, a citizen of the United States, residing at Farmingdale, L. I., in the county of Nassau and State of New York, has invented certain new and useful Improvements in Distance-Measuring Instruments for Aircraft, of which the following is a specification.

This invention relates to distance of flight measuring instruments for aircraft actuated by the movement of the craft through the air, such, for instance, as shown in the United States patent to Titterington, No. 1,368,000. Such instruments may not only be used for measuring and indicating the distances traveled by aircraft, but may also be used as a distance responsive device for bringing into action a means on the craft for performing a predetermined function such as the dropping of a bomb or causing the descent of the craft after the same has traveled a predetermined distance. This invention has especial reference to the last named use of the instrument on aerial torpedoes which are flown without a pilot, although many features of the invention are adapted for ordinary distance measuring devices.

One of the principal objects of the invention is to improve the operation of such instruments by improving the mechanism used to transmit the varying air pressure impulses from the transmitter to the indicator. A further object of the invention is to provide a simple and reliable means for preventing the turning of the transmitter before the launching of the torpedo by air currents along the ground and at the same time to release the transmitter immediately upon the launching of the torpedo.

Referring to the drawings in which what I now consider to be the preferred form of my invention, are shown:

Fig. 1 is a diagrammatic view showing the air-driven transmitter in section, the receiver in plan, and the auxiliary mechanism diagrammatically, with the connections between the various instruments.

Fig. 2 is a vertical section of the indicating means which is also employed as the means for bringing into action at the end of a predetermined distance other mechanism on the aircraft for performing any one of the above named functions.

Fig. 3 is a transverse section of a portion of Fig. 1, the section being taken at right angles to the section line in Fig. 1.

Fig. 4 is a section on line 4—4 of Fig. 2 looking in the direction of the arrows.

Fig. 5 is a detail of a portion of Fig. 1 in plan.

In Fig. 1 the transmitting instrument is shown as comprising a cigar shaped housing 1 having a revoluble nose 2 at the forward end thereof. Said nose is shown as threaded on a shaft 3 mounted on ball bearings 4 and 5 in a block 6 secured in the end of the cylindrical tube 1. Said nose may be locked in place by set screw 7 and has mounted therein a plurality of blades 8 and 9, each of which is shown in the form of a disk 10 secured to stem 11 which is threaded in said revoluble nose. Preferably, said nose is conoidal in shape or of stream line formation so that the whole instrument is of minimum resistance. For oiling the bearings, an oil cup 70 is shown. The shaft 3 is geared to a train of suitable reduction gearing, the shaft being shown as threaded adjacent the inner end or provided with a worm 13 which meshes with a small worm wheel 14 on a short shaft 15 journalled between plates 16 and 17 within said housing. Said shaft is provided with a pinion 18 meshing with a gear 19 on shaft 20, which shaft is also provided with a pinion 21 driving the gear 22, which has pinion 23 secured thereto. Said pinion meshes with gear 24, on the shaft 24' on which is mounted a cam 25 which operates the transmitter proper. As shown, a lever 26 pivoted at 27 which bears at one end on said cam is so designed that it holds the far end 28 of said lever against the open end of the pipe 29 so as to close that outlet during the major portion of its revolution. When the cam turns in the direction of the arrow slightly beyond the position shown in Fig. 3, the lever is suddenly snapped open by the action of spring 30 and is then gradually closed by the cam.

I have shown further reduction gearing beyond the gear 24 for the purpose of checking up the accuracy of the transmitter and comparing the same with the receiving instrument. The first pair of reduction gears 71 has a graduated disk 72 mounted on the shaft thereof and readable on the top of the casing. Preferably, said casing is depressed at 73 so that said disk does not project above the stream lines of the tube 1.

The second set 74 of reduction gears is also provided with a similar disk 72'. A reference index 75' is provided for each graduated disk. By trying out the indicator in a wind tunnel or in flights over a measured course, tables may be prepared showing very accurately the distances measured by a given number of revolutions or the indicator may be connected with the transmitter and graduated in accordance with the known characteristics of the transmitter.

Preferably, the whole interior of the tube 1 is maintained at a pressure different from that of the atmosphere—i. e. either above or below atmospheric pressure. For this purpose, a centrifugal or other air pump 31 is shown diagrammatically as driven from the gear 32' on the driving engine (not shown) of the aeroplane or other source of power. The said pump may be either a pressure or vacuum pump but for the sake of illustration we may assume that it is a pressure pump throughout the following discussion.

The pump is shown as connected to the small reservoir 32 which has a connection to the interior of the tube 1 through pipe 33 and also to the various other instruments on the aircraft operated by air. An auxiliary or alternative means for maintaining air pressure within the tube 1 is also shown comprising a downwardly turned lip 34 which is opened toward the bow of the aeroplane so that as the aeroplane travels through the air, air will flow into the opening 35 and maintain a pressure within the tube 1. The outlet pipe 29 which is opened and closed by the lever 28 leads to an air-operated bellows or a similar device 36 in which there is provided a restricted opening (not shown). The bellows is normally maintained in a closed position by spring 37.

It will be apparent, therefore, that as long as the end of tube 29 is closed, the bellows will remain collapsed but that when the end of the tube is suddenly opened by the quick movement in the lever 28, the bellows will be quickly expanded to move the link 38 connected thereto. Said link is shown as pinned to a lever 39 having a pawl 40 engaging ratchet 41. It will be evident, therefore, that as the bellows expands, it will turn the ratchet wheel through the space of one or more teeth dependent upon the design. Said ratchet wheel is shown as mounted on the shaft 43 which also has mounted thereon mutilated gear 44 having, for instance, a tooth 45 which strikes on each revolution a notched wheel 46 on shaft 47. Said wheel is provided with a similar tooth 45' and so on throughout the train. Each of shafts 43, 47, 47' and 55 is slidably mounted in its bearings 48, 49 in the housing 50 of the indicator, each shaft being normally held in proper position by a spring 51 or 52. The purpose of such mounting is to enable the operator to either reset the indicator or to set it to any predetermined distance of flight by grasping the proper knobs 53 and pressing or pulling out the same (as the case may be) to disengage the gears and then turning the indicators while so disengaged to the proper readings. The last one 55 of the series of shafts may be provided with a cam 25' similar to the cam 25 and operating the lever 26' similar to lever 26. A pipe 56 leading within the casing 50 is normally closed by said lever 26' and is suddenly opened by the action of the cam 25', as explained, in connection with lever 26. Pressure is maintained within the casing 50 by the pipe 33' connected with pipe 33 or with the interior casing 1 or both.

Pipe 56 is shown as leading to a power relay 57 which controls the cylinders 58 and 59 which operate the longitudinal control rudders of the aeroplane by any means, such as wires 60 and 61. Details of said relay 57 are not shown, as any suitable air-operated mechanism for admitting air from the tank 32 to the cylinders may be employed. The relay is also preferably under the control of the control gyroscope on the aeroplane (not shown) through the pipe 62. It is, of course, obvious that if the transmitter were free to rotate while the aeroplane or aerial torpedo is resting on the ground prior to launching, the wind along the ground would rotate the same an unknown number of revolutions which would destroy the usefulness of the instrument. I provide means, therefore, for preventing such accidental operation until the aeroplane or aerial torpedo is actually launched. Simple means is shown in Fig. 1 comprising a clasp 80 pinched on one of the blades 10 and connected by a cord 81 to a weight 82 designed to rest upon the ground. Said clasp holds with sufficient pressure to prevent rotation of the fan by the wind, but as soon as the aeroplane starts to move, the heavy weight 82 will jerk the clasp 80 off the fan and permit it to rotate.

As explained above, one of the principal purposes of the invention is to provide a simple and novel means for causing an aerial torpedo to descend or to drop a bomb at the end of a predetermined distance of flight. The operation of this mechanism for the purpose is as follows:

The indicator 50 is first set to the required distance of flight by manipulating the thumb pieces 53, as explained. The numbers set on the dial, however, do not indicate directly the distance of flight but are set to a number which is the complement of said distance. To explain, if the unit of graduation is ten yards, and it is desired to cause the aerial torpedo to descend, for instance, at a distance of 7,000 yards, the indicator would be set to 100,000 minus 7,000 or 93,000, as shown in Fig. 1.

Note also Fig. 5 in which the indicating numerals are 93, representing 93,000 yards. Thus, also, if the distance required is 75,000 yards, the indicator would be set to 25,000 yards. The reason for this is that the cam 25′ is not turned to the position permitting the lever 26′ to be snapped back until numeral 9 has appeared on the disk 42′ and the cam is again approaching to zero.

It will be understood that correction may be made for wind velocity and other known factors. Thus, if the torpedo is to be dropped after traveling a distance of 10,000 yds. and the wind is blowing in the direction of flight of the aircraft at a given rate, the correction would consist in subtracting from 10,000 a calculated amount, and the indicator would be set accordingly to indicate the actual air distance. Similarly, if the wind should be moving in the opposite direction at a given rate, the calculated amount would be added to the 10,000 since the air-distance to be covered is greater.

After the apparatus is set, as described, the engine is started and, as soon as the aeroplane is released, the connection 80 will be pulled off the fan 10 so that it is free to revolve. The operation of reduction gears 18, 19, etc. will then gradually turn cam 25 until lever 26 is snapped open, thereby transmitting a definite, sharp impulse through the pipe 29 to the indicator moving the ratchet wheel 41 through a notch. This will continue until finally the cam 25′ is turned until the lever 26′ is snapped open or, in other words, away from the pipe 56, thereby transmitting an impulse to the relay 57. The latter is so designed that the pistons 58 and 59 will then be operated automatically to drop a bomb or star-shell or to perform other similar function to actuate a lever like that shown in Fig. 24 of the patent to Sperry et al., No. 1,384,868, patented July 19, 1921.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an air distance measuring instrument, the combination with a casing, a part rotated by the wind, reduction gearing actuated thereby, means for maintaining a pressure differential within said casing, a normally closed connection leading out of said casing, and quick action means for opening said connection actuated by said gearing.

2. In an air distance measuring instrument, the combination with a casing, a part rotated by the wind, reduction gearing actuated thereby, means for maintaining a pressure differential within said casing, a normally closed connection leading out of said casing, and a cam rotated by said gearing for suddenly opening said connection.

3. In an air distance measuring instrument, a part rotated by the wind, means for transmitting periodic impulses actuated thereby, a settable receiver actuated by said impulses and means associated with said receiver for transmitting an impulse after a predetermined distance has been covered.

4. In an air distance measuring instrument, a part rotated by the wind, means for transmitting periodic impulses actuated thereby, a settable receiver actuated by said impulses, means associated with said receiver for transmitting an impulse after a predetermined distance has been covered, and a common source of air under pressure for supplying said two transmitting means.

5. In combination with an air distance measuring instrument for aircraft having a fan rotated by the wind, means for preventing rotation of said fan prior to launching, said means being automatically released by the launching operation.

6. In combination with an air distance measuring instrument for aircraft having a fan rotated by the wind, means for preventing rotation of said fan prior to launching, and means operable upon launching the craft for releasing said other means.

7. A distance responsive gear for aerial torpedoes and the like comprising a wind driven transmitting instrument, a settable receiving instrument, means for maintaining a differential air pressure within said last named instrument, and means operated when said instrument registers a predetermined distance for transmitting said pressure for bringing extraneous mechanism into action.

8. A distance responsive gear for aerial torpedoes and the like comprising a means for supplying air under a pressure different from that of the atmosphere, a wind driven transmitting instrument, a receiving instrument, and a power instrumentality adapted for controlling the torpedo controlled therefrom, each of said instrumentalities being air operated and supplied by said air source.

9. A distance-responsive gear for aerial torpedoes and the like, comprising a part rotated by the wind, a power instrumentality, means adapted to actuate said power instrumentality after a predetermined degree of operation of said means, and means operated by said part for actuating said first-named means.

10. A distance-responsive gear for aerial torpedoes and the like, comprising a part rotated by the wind, a power instrumentality, means adapted to actuate said power instrumentality after a predetermined degree of operation of said means, a settable means for predetermining said degree, and means operated by said part for actuating said first-named means.

In testimony whereof I have affixed my signature.

LAWRENCE B. SPERRY.